Jan. 27, 1970     F. B. SATTERWHITE     3,491,419
METHOD OF CRIMPING AND FIBRILLATING FILM
Filed Aug. 9, 1967
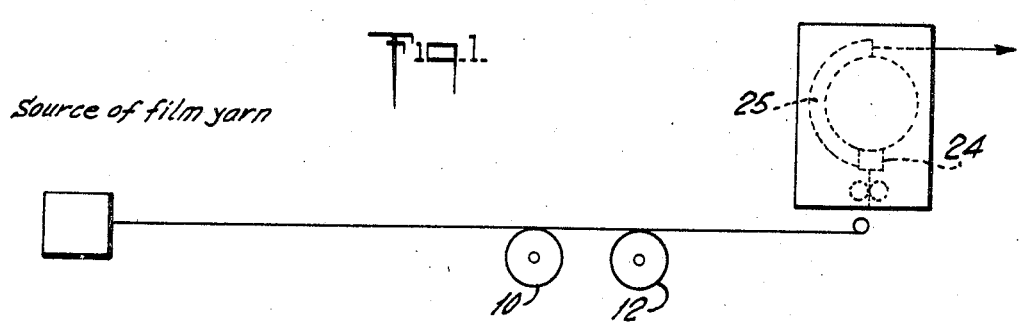
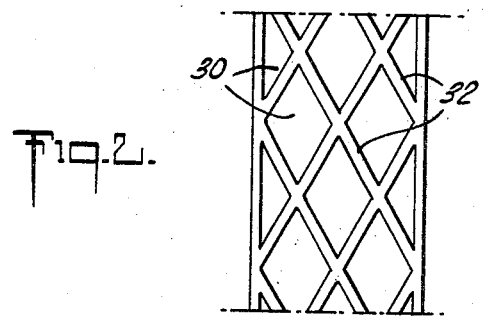
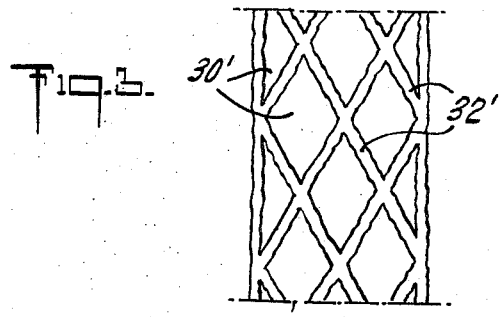
INVENTOR
FRED B. SATTERWHITE
BY
Nolte & Nolte
ATTORNEYS

United States Patent Office 3,491,419
Patented Jan. 27, 1970

3,491,419
METHOD OF CRIMPING AND FIBRILLATING FILM
Fred B. Satterwhite, Williamsburg, Va., assignor, by mesne assignments, to The Klinger Manufacturing Company, Limited, London, England, a corporation of Great Britain
Filed Aug. 9, 1967, Ser. No. 659,512
Int. Cl. D04h *17/00, 15/00;* D05c *15/00*
U.S. Cl. 28—72    5 Claims

ABSTRACT OF THE DISCLOSURE

A synthetic yarn product is manufactured by the process of fibrillating film that is highly oriented. The film is subjected to mechanical working thereof in order to break down the film to provide fibrillation. The method comprising this invention is applicable to ribbons one to two inches in transverse width or a plurality of small ribbons either twisted together into a bundle or in individual strips.

---

The present invention relates generally to the synthetic yarns and more particularly to an improved method for fibrillating the yarns as well as to crimping film while simultaneously fibrillating it.

The technique for fabricating textile type yarn from select films and/or fibrillated films is rapidly growing in popularity due to the fact that this production method is substantially less expensive than the multifilament extrusion techniques used in the past. The work done in this field has been primarily with polypropylene as well as polyester and polyamide polymers. The conventional technique requires the extrusion of film from a standard extruder and the orientation of the film in one or more directions. After the film has received some orientation, it is slit and receives a higher degree of orientation which produces some fibrillation. One method of forming the very high degree of fibrillation is to extrude a polypropylene film approximately one foot wide and then slit it into ribbons ⅛ of an inch wide. At some stage in the production moisture is introduced into the film and in another, subsequent stage the moisture is pulled out at a high speed in order to fibrillate the film. It should be noted that when the film is oriented in one direction the molecular structure is aligned and some slight fibrillation takes place in that direction. As a result, there is little strength in the transverse direction.

Slit yarns and fibrillated yarns produced from film may be used for example, in outdoor carpeting, primary and secondary carpet backing, face yarns for indoor carpets, baler and agricultural twines, insulating, upholstery or decoration yarns. In order to warrant replacing the synthetic yarns produced by the standard multifilament extrusion technique, the production of fibrillated yarns should be substantially less expensive. The fibrillated yarns should be capable of production without complex costly additional structure. The present invention meets these requirements by using yarn drawing and crimping apparatus. Subsequent to the drawing operation, a back pressure is applied to the yarn, which back pressure produces fibrillation. The present invention will be described particularly in connection with polypropylene but it should be clearly understood that the concept is not limited thereto. It should also be understood that the present invention is applicable to twisted film roughly ⅛ in diameter, ribbons one to two inches in width, a plurality of small diameter ribbons that are twisted together or individual, small diameter ribbons. The present invention could also be applicable to wider sheets of film.

A length of film is drawn and highly oriented by passing it around two rollers, either one or both of which may be heated. The film is then passed between the nip of two adjacent drive rollers into a texturizing station comprising a back pressure chamber thus providing working of the film to produce fibrillation or further fibrillation in the case of previously fibrillated film.

Accordingly, it is an object of this invention to provide an improved method for processing film to provide fibrillation, further fibrillation and crimped fibrillated film.

An additional object is to provide a film processing method for simultaneously crimping and fibrillating film.

It is an important object of this invention to provide a film fibrillating method that is applicable to slit film as well as extruded film sheets.

Still another object of this invention is to provide a fibrillating method that is applicable to twisted film strips or ribbons.

These and other objects, features and advantages of the invention will in part be pointed out with particularly and will in part become obvious from the following more detailed description of the invention taken in conjunction with the accompanying drawing which forms an integral part thereof.

In the drawing:
FIG. 1 is a schematic illustration of apparatus that may be employed in the process of the invention;
FIG. 2 is a greatly enlarged schematic illustration of a portion of film that has been previously fibrillated; and
FIG. 3 is a greatly enlarged schematic illustration of crimped fibrillated film.

For the purposes of this discussion, it will be assumed that the material in question is ⅛ diameter polypropylene film strip that results from the slitting of one foot wide extruded film. The present invention is not limited to either this dimension or this material and it is mentioned only for purposes of illustration.

The present film fibrillating and/or crimping process may be performed on a machine of the type described in my co-pending application, Ser. No. 532,642 entitled Yarn Treating Apparatus and Method. Briefly, this apparatus includes two spaced rollers 10 and 12 either one or both of which may be heated and about which the film is wrapped.

Roller 10 is run at a peripheral speed of aproximately two and one-half to five times slower than that of roller 12. This action provides the drawing of the film and consequently provides the high degree of orientation of the molecular structure that is required prior to fibrillation. Alternatively pre-drawn film may be used or pre-fibrillated film may be used, and the amount of drawing will be adjusted for various applications. After the film is drawn, it is then passed, in a heated condition, from roller 12 through the nip of driven rollers (shown dotted) which are rotated at the same peripheral speed as roller 12. The nip rollers pass the heated and drawn film into a crimping area 24 which may be a short crimping chamber 24 of the stuffer box type, the details of construction of which are fully set forth in U.S. Patent No. 3,212,157.

As the film passes through the crimping area, a back pressure is applied thereto. The slower the film moves through the crimper box, the more back pressure will be applied, therefore, more working of the film with a resulting greater fibrillation. The now crimped, fibrillated film may be heat set in a heated chamber in area 25 as shown and described in detail in U.S. Patent 3,212,151. The processed film may now be taken up or sent on for further processing.

FIG. 2 illustrates film that has been fibrillated prior to crimping. FIG. 3 illustrates film that has been crimped and fibrillated via the process of the invention and also illustrates film that has been further fibrillated and simultaneously crimped after a certain amount of pre-fibrillation. As the film breaks down apertures 30 and fibers 32 appear. (30' and 32' on FIG. 3 in the crimped fibrillated film made according to the invention.) It will be apparent that complex and costly installations are not required and that presently available machinery and apparatus may be used to provide a fibrillated film at substantially less cost than was heretofore available.

There has been disclosed heretofore the best embodiment of the invention presently contemplated. It is to be understood, however, that various changes and modifications may be made by those skiled in the art without departing from the spirit of the invention.

What is claimed is:

1. The method of processing film comprising the steps of:
   (a) drawing a unitary film around two spaced rotating rollers at least one of which is heated to thereby orient the film;
   (b) longitudinally compressing the unitary film sufficiently to provide a crimping and fibrillation thereof; and
   (c) withdrawing the crimped, fibrillated film.

2. A method of processing film, comprising feeding a unitary oriented film to a crimping zone, longitudinally compressing the unitary film in said zone thereby to crimp and also to fibrillate the film and withdrawing the film from said zone.

3. The method in accordance with claim 2 including the step of drawing the film prior to crimping to thereby orient the film.

4. The method in accordance with claim 2 including the step of maintaining the film in a heated condition during said crimping step.

5. The method in accordance with cliam 4 including the step of heat setting the crimped fibrillated film.

References Cited

UNITED STATES PATENTS 3,336,174   8/1967   Dyer et al. _____ 156—167
3,378,997   4/1968   Matsui et al.

LOUIS K. RIMRODT, Primary Examiner

U.S. Cl. X.R.
28—1; 264—147